(12) United States Patent
Celik et al.

(10) Patent No.: US 8,064,956 B2
(45) Date of Patent: Nov. 22, 2011

(54) EVENT SHARING

(75) Inventors: Feyzi Celik, Hopkinton, MA (US);
Marcin Nowak, Westborough, MA (US); Chris DeGrace, Cambridge, MA (US); Jeffrey S. Finn, Natick, MA (US)

(73) Assignee: Onepin, Inc., Westborough, MA (US)

( * ) Notice: Subject to any disclaimer, the term of this patent is extended or adjusted under 35 U.S.C. 154(b) by 1018 days.

(21) Appl. No.: 11/829,698

(22) Filed: Jul. 27, 2007

(65) Prior Publication Data

US 2008/0032742 A1 Feb. 7, 2008

Related U.S. Application Data

(60) Provisional application No. 60/835,248, filed on Aug. 2, 2006.

(51) Int. Cl.
*H04W 4/00* (2009.01)
(52) U.S. Cl. .................. 455/558; 455/433; 455/445
(58) Field of Classification Search .................. 455/558, 455/433, 445
See application file for complete search history.

(56) References Cited

U.S. PATENT DOCUMENTS

| | | |
|---|---|---|
| 4,654,793 A | 3/1987 | Elrod |
| 4,774,618 A | 9/1988 | Raviv |
| 4,945,218 A | 7/1990 | Talbott |
| 5,483,052 A | 1/1996 | Smith, III et al. |
| 5,493,105 A | 2/1996 | Desai |
| 5,590,197 A | 12/1996 | Chen et al. |
| 5,604,640 A | 2/1997 | Zipf et al. |
| 5,612,524 A | 3/1997 | Sant'Anselmo et al. |
| 5,640,565 A | 6/1997 | Dickinson |
| 5,671,279 A | 9/1997 | Elgamal |
| 5,671,282 A | 9/1997 | Wolff et al. |

(Continued)

FOREIGN PATENT DOCUMENTS

CN 1567936 A 1/2005

(Continued)

OTHER PUBLICATIONS

Dawson et al., "vCard MIME Directory Profile; rfc2426.txt", IETF Standard, Internet Engineering Task Force, IETF, CH, pp. 1-42 (1998).

(Continued)

*Primary Examiner* — Pierre-Louis Desir
(74) *Attorney, Agent, or Firm* — Mintz, Levin, Cohn, Ferris, Glovsky and Popeo, P.C.

(57) ABSTRACT

An apparatus for use with a mobile communication device, the mobile communication device being configured to provide events, the apparatus including a memory including computer readable instructions, and a processor coupled to the memory and configured to execute, using the computer readable instructions stored in the memory, a primary application and a plurality of secondary applications, wherein the primary application is configured to register with the mobile communication device such that the primary application is configured to automatically receive an event from the mobile communication device, wherein the secondary applications are configured to register with the primary application, wherein the primary application is configured to relay a first message including information indicative of the received event to a first one of the registered secondary applications, and to receive a response to the first message from the first one of the secondary applications, and wherein the primary application is configured to provide a message to the mobile communication device, in response to the received event, as a function of the response received from the first one of the plurality of secondary applications.

21 Claims, 11 Drawing Sheets

U.S. PATENT DOCUMENTS

| | | | |
|---|---|---|---|
| 5,678,041 A | 10/1997 | Baker et al. | |
| 5,689,654 A | 11/1997 | Kikinis et al. | |
| 5,692,073 A | 11/1997 | Cass | |
| 5,715,399 A | 2/1998 | Bezos | |
| 5,732,229 A | 3/1998 | Dickinson | |
| 5,740,549 A | 4/1998 | Reilly et al. | |
| 5,774,117 A | 6/1998 | Kukkal et al. | |
| 5,791,991 A | 8/1998 | Small | |
| 5,793,972 A | 8/1998 | Shane | |
| 5,794,219 A | 8/1998 | Brown | |
| 5,794,232 A | 8/1998 | Mahlum et al. | |
| 5,806,043 A | 9/1998 | Toader | |
| 5,848,412 A | 12/1998 | Rowland et al. | |
| 5,878,397 A | 3/1999 | Stille et al. | |
| 5,987,136 A | 11/1999 | Schipper et al. | |
| 6,092,133 A | 7/2000 | Erola et al. | 710/102 |
| 6,094,573 A | 7/2000 | Heinonen et al. | 455/412 |
| 6,115,711 A | 9/2000 | White | |
| 6,161,113 A | 12/2000 | Mora et al. | |
| 6,161,124 A | 12/2000 | Takagawa et al. | |
| 6,185,553 B1 | 2/2001 | Byrd et al. | |
| 6,199,099 B1 | 3/2001 | Gershman et al. | |
| 6,324,587 B1 | 11/2001 | Trenbeath et al. | |
| 6,346,881 B1 | 2/2002 | Davidson | |
| 6,356,905 B1 | 3/2002 | Gershman et al. | |
| 6,374,259 B1 | 4/2002 | Celik | 707/104 |
| 6,433,795 B1 | 8/2002 | MacNaughton et al. | 345/738 |
| 6,459,904 B1 | 10/2002 | Lorello et al. | |
| 6,564,261 B1 | 5/2003 | Gudjonsson et al. | 709/227 |
| 6,615,057 B1 | 9/2003 | Pettersson | 455/558 |
| 6,633,311 B1 | 10/2003 | Douvikas et al. | |
| 6,654,768 B2 | 11/2003 | Celik | 707/104.1 |
| 6,694,353 B2 | 2/2004 | Sommerer | |
| 6,810,405 B1 | 10/2004 | LaRue et al. | |
| 6,859,650 B1 | 2/2005 | Ritter | 455/406 |
| 6,859,829 B1 | 2/2005 | Parupudi et al. | 709/224 |
| 6,868,451 B1 | 3/2005 | Peacock | |
| 6,973,477 B1 | 12/2005 | Martino | 709/203 |
| 7,146,165 B2 | 12/2006 | Manner et al. | 455/432.3 |
| 7,222,147 B1 | 5/2007 | Black et al. | 709/200 |
| 7,225,244 B2 | 5/2007 | Reynolds et al. | 709/223 |
| 7,296,036 B2 | 11/2007 | Celik | 707/201 |
| 7,349,907 B2 | 3/2008 | Celik | 707/10 |
| 7,353,044 B2 | 4/2008 | Nachef | 455/558 |
| 7,447,510 B2 | 11/2008 | Celik et al. | 455/466 |
| 7,509,349 B2 | 3/2009 | Celik | |
| 7,567,542 B2 | 7/2009 | Rybak et al. | |
| 2001/0020239 A1 | 9/2001 | Ukigawa et al. | |
| 2001/0044321 A1 | 11/2001 | Ausems et al. | |
| 2002/0138470 A1 | 9/2002 | Zhou | |
| 2003/0009374 A1 | 1/2003 | Moodie et al. | |
| 2003/0009385 A1 | 1/2003 | Tucciarone et al. | |
| 2003/0022697 A1 | 1/2003 | Chen et al. | |
| 2003/0073440 A1 | 4/2003 | Mukherjee et al. | 455/435 |
| 2003/0083078 A1 | 5/2003 | Allison et al. | 455/466 |
| 2003/0135586 A1 | 7/2003 | Minborg et al. | |
| 2003/0163598 A1 | 8/2003 | Wilson et al. | 709/318 |
| 2003/0172138 A1 | 9/2003 | McCormack et al. | |
| 2003/0236769 A1 | 12/2003 | Pyhalammi | |
| 2004/0024846 A1 | 2/2004 | Randall et al. | 709/219 |
| 2004/0093317 A1 | 5/2004 | Swan | 707/1 |
| 2004/0128151 A1 | 7/2004 | Mock et al. | |
| 2004/0199598 A1 | 10/2004 | Kalfas | 709/207 |
| 2004/0235503 A1 | 11/2004 | Koponen et al. | 455/466 |
| 2004/0242216 A1 | 12/2004 | Boutsikakis | |
| 2004/0249846 A1 | 12/2004 | Randall et al. | 707/102 |
| 2005/0021571 A1 | 1/2005 | East | 707/201 |
| 2005/0047582 A1 | 3/2005 | Shaffer et al. | 379/265.11 |
| 2005/0059418 A1 | 3/2005 | Northcutt | |
| 2005/0102328 A1 | 5/2005 | Ring et al. | 707/201 |
| 2005/0117523 A1 | 6/2005 | Parupudi et al. | |
| 2005/0122909 A1 | 6/2005 | Parupudi et al. | |
| 2005/0122910 A1 | 6/2005 | Parupudi et al. | |
| 2005/0149487 A1 | 7/2005 | Celik | 707/1 |
| 2005/0208927 A1 | 9/2005 | Wong et al. | 455/412.1 |
| 2006/0031237 A1 | 2/2006 | DeAnna et al. | 707/100 |
| 2006/0041590 A1 | 2/2006 | King et al. | |
| 2006/0089130 A1 | 4/2006 | Yamamura et al. | |
| 2006/0101266 A1 | 5/2006 | Klassen et al. | 713/170 |
| 2006/0212482 A1 | 9/2006 | Celik | |
| 2006/0235931 A1 | 10/2006 | Ruthe et al. | |
| 2006/0290496 A1 | 12/2006 | Peeters | |
| 2007/0021111 A1 | 1/2007 | Celik | |
| 2007/0061420 A1 | 3/2007 | Basner | |
| 2007/0181675 A1 | 8/2007 | Drummond et al. | 235/381 |
| 2008/0015998 A1 | 1/2008 | Celik | |
| 2008/0032742 A1* | 2/2008 | Celik et al. | 455/558 |
| 2008/0090597 A1 | 4/2008 | Celik et al. | |
| 2008/0130554 A1 | 6/2008 | Gisby et al. | |
| 2008/0257952 A1 | 10/2008 | Zandonadi | 235/379 |
| 2008/0261577 A1 | 10/2008 | Celik et al. | |
| 2009/0042590 A1 | 2/2009 | Celik et al. | |
| 2009/0097633 A1 | 4/2009 | James, Jr. et al. | |
| 2009/0119339 A1 | 5/2009 | Celik | |
| 2009/0164519 A1 | 6/2009 | Vainio | |
| 2009/0176485 A1 | 7/2009 | Michaels et al. | |
| 2009/0221307 A1 | 9/2009 | Wolak et al. | |
| 2009/0254572 A1 | 10/2009 | Redlich et al. | |
| 2009/0327282 A1 | 12/2009 | Wittig et al. | |

FOREIGN PATENT DOCUMENTS

| | | |
|---|---|---|
| CN | 1589046 | 3/2005 |
| CN | 1589046 A | 3/2005 |
| EP | 1024674 A1 | 8/2000 |
| EP | 1189412 A2 | 3/2002 |
| EP | 1372327 A1 | 12/2003 |
| EP | 1 677 186 A1 | 7/2006 |
| GB | 2399255 A | 9/2004 |
| RU | 2246754 | 2/2005 |
| WO | WO 97/01137 | 1/1997 |
| WO | WO 98/03923 | 1/1998 |
| WO | WO 98/06055 | 2/1998 |
| WO | WO 98/24036 | 6/1998 |
| WO | WO 99/29127 | 6/1999 |
| WO | WO 02/39300 A1 | 5/2002 |
| WO | 02098146 A2 | 12/2002 |
| WO | WO-03098409 A1 | 11/2003 |
| WO | WO-2004056140 A1 | 7/2004 |
| WO | WO-2006011995 A2 | 2/2006 |
| WO | WO-2006088627 A2 | 8/2006 |
| WO | WO 2007/031708 A1 | 3/2007 |
| WO | WO-2007094823 A1 | 8/2007 |
| WO | WO-2008016553 A2 | 2/2008 |
| WO | WO-2008051276 A2 | 5/2008 |
| WO | WO-2008057349 A2 | 5/2008 |
| WO | WO-2008130653 A1 | 10/2008 |

OTHER PUBLICATIONS

ETSI Standards, European Telecommunications Standards Institute, Sophia-Antipo, FR, "Digital cellular telecommunications system (Phase 2+); Universal Mobile Telecommunications System (UMTS); Technical realization of Short Message Service (SMS) (3GPP TS 23.040 version 6.6.0 Release 6); ETSI TS 123 040", 3-T2(V660):1-192 (2005).

ETSI Standards, European Telecommunications Standards Institute, Sophia-Antipo, FR, "Smart cards; ETSI numbering system for telecommunication application providers (Release 7); ETSI TS 101 220", SCP-WG1(V740):1-27 (2006).

Howes et al., "A MIME Content-Type for Directory Information; rfc2425.txt", IETF Standard, Internet Engineering Task Force, IETF, CH, pp. 1-33 (1998).

Versit Consortium, "vCard—The Electronic Business Card—Version 2.1—Specifications", Internet citation, [Online] Sep. 18, 1996, XP002318282, retrieved from Internet: URL:http://www.imc.org/pdi/vacrd-21.doc> [retrieved on Feb. 18, 2005], pp. 1-40.

U.S. Appl. No. 12/423,711, filed Apr. 14, 2009, Celik.
U.S. Appl. No. 12/423,715, filed Apr. 14, 2009, Celik.
U.S. Appl. No. 12/423,717, filed Apr. 14, 2009, Celki.
U.S. Appl. No. 60/102,614, filed Oct. 1, 1998, Celik.
U.S. Appl. No. 60/862,453, filed Oct. 22, 2006, Celik.
U.S. Appl. No. 60/863,899, filed Nov. 1, 2006, Celik.
U.S. Appl. No. 60/913,187, filed Apr. 20, 2007, Celik.
U.S. Appl. No. 61/49,263, filed May 12, 1980, Nakano.

U.S. Appl. No. 61/83,377, filed Sep. 2, 1980, Liang.
U.S. Appl. No. 61/109,722, filed Oct. 30, 2008, Celik.
George Kambourakis et al., "Delivering Attribute Certificates over GPRS", 2004, ACM, NY, NY, pp. 1166-1170.
International Search Report for PCT/US06/38589, mailed Apr. 30, 2007.
International Search Report for PCT/US2006/009262, mailed Mar. 31, 2009.

Ulrike Meyer et al., "A man-in-the-middle attack on UMTS", 2004, ACM, NY, NY, pp. 90-97.
Communication pursuant to Article 94(3) of the EPC, EP Applicatoin 07118156.4, dated Oct. 9, 2009.
U.S. Appl. No. 61/049,263; Celik, filed Apr. 30, 2008.
U.S. Appl. No. 61/083,377; Celik, filed Jul. 24, 2008.

* cited by examiner

FIG. 9 ps://r2-ocr-benchmark-pdfs.r2.obsidian-patents.workers.dev/Patents_4/US8064956B2.pdf
EVENT SHARING

CROSS-REFERENCE TO RELATED ACTIONS

This application claims the benefit of prior U.S. Provisional Application No. 60/835,248 filed Aug. 2, 2006, which is incorporated by reference herein.

BACKGROUND

Mobile communication devices (e.g., cell phones) that use a smart card to control network access and subscription services typically issue events when certain predetermined actions occur (e.g., when a user attempts to make a call). These events are typically issued to an application stored on the smart card and can include call control events and/or mobile originated short message service (MOSMS) control events. These events typically include the phone number that was input by a user of a mobile communication device as an intended recipient (e.g., the telephone number of another mobile communication device that a user wishes to call and/or send a short message service (SMS) message to). The events are typically sent to an application stored on the smart card for acceptance prior to the communication event (e.g., a call or an SMS message) being completed.

The smart cards used by the mobile communication devices typically include one or more applications that use the events provided by the mobile communication device to control the operation of the mobile communication device. For example, the applications stored on the smart card can be configured to allow, bar, and/or modify a call or SMS message. Only a single application included in the smart card, however, can subscribe to receive specific events (e.g., the call/MOSMS control events) from the mobile communication device. Thus, the mobile communication device (or the operator of the mobile communication device) typically must choose which application should receive the events from the mobile communication device.

SUMMARY

In general, in an aspect, the invention provides an apparatus for use with a mobile communication device, the mobile communication device being configured to provide events, the apparatus including a memory including computer readable instructions, and a processor coupled to the memory and configured to execute, using the computer readable instructions stored in the memory, a primary application and a plurality of secondary applications, wherein the primary application is configured to register with the mobile communication device such that the primary application is configured to automatically receive an event from the mobile communication device, wherein the secondary applications are configured to register with the primary application, wherein the primary application is configured to relay a first message including information indicative of the received event to a first one of the registered secondary applications, and to receive a response to the first message from the first one of the secondary applications, and wherein the primary application is configured to provide a message to the mobile communication device, in response to the received event, as a function of the response received from the first one of the plurality of secondary applications.

Implementations of the invention may provide one or more of the following features. The primary application is configured to prioritize the secondary applications such that information indicative of the received event is provided to each of the secondary applications in sequence according to a priority assigned to each respective secondary application. The primary application provides a second message including information indicative of the received event to a second one of the secondary applications if the response is received from the first one of the secondary applications in response to the first message. The secondary applications are further configured to analyze messages from the primary application to determine if a predetermined event has occurred. The secondary applications are configured to provide the response to the primary application as a function of whether the predetermined event occurred. The primary application is configured to communicate with the mobile communication device via a subscriber identity module toolkit framework. The event is a call control event. The event is a mobile originated short message service control event.

In general, in another aspect, the invention provides a method for use with a mobile communication device, the mobile communication device being configured to provide events, the method including, identifying events provided by the mobile communication device for a primary application to subscribe to, providing a message from the primary application to the mobile communication device including the identified events, receiving information, by the primary application, indicative of a plurality of secondary applications that desire notification of received events, dispatching a message including information indicative of received events to at least one of the plurality of secondary applications, determining whether a response was received from at least one of the secondary applications in response to the primary application dispatching the message.

Implementations of the invention may also provide one or more of the following features. The method further includes prioritizing the secondary applications such that dispatched messages are provided to each of the secondary applications in sequence according to a priority assigned to each respective secondary application. Dispatching the message includes dispatching a first message to a first one of the secondary applications, and a second message to a second one of the secondary applications if a response is received from the first one of the secondary applications in response to the first message. Analyzing, using a first one of the secondary applications, the dispatched message in order to determine if a predetermined event has occurred. Providing a response, using the first one of the secondary applications, to the primary application as a function of whether the predetermined event occurred. The message provided from the primary application to the mobile communication device is provided via a subscriber identity module toolkit framework. The method further including receiving a call control event. The method further includes receiving a mobile originated short message service control event.

In general, in another aspect the invention provides a computer program product including instructions that, when executed by a processor, cause the processor to identify events provided by the mobile communication device for a primary application to subscribe to provide a message from the primary application to the mobile communication device including the identified events, receive information, by the primary application, indicative of a plurality of secondary applications that desire notification of received events, dispatching a message including information indicative of received events to at least one of the plurality of secondary applications, determine whether a response was received from at least one of the secondary applications in response to the primary application relaying a received event.

Implementations of the invention may provide one or more of the following features. The instructions, when executed by a processor, further cause the processor to prioritize the secondary applications such that dispatched messages are provided to each of the secondary applications in sequence according to a priority assigned to each respective secondary application. The instructions, when executed by a processor, further cause the processor to dispatch a first message a first one of the secondary applications, and dispatch a second message to a second one of the secondary applications if a response is received from the first one of the secondary applications in response to the first message. The instructions, when executed by a processor, further cause the processor to analyze, using a first one of the secondary applications, the dispatched message in order to determine if a predetermined event has occurred. The instructions, when executed by a processor, further cause the processor to provide a response, using the first one of the secondary applications, to the primary application as a function of whether the predetermined event occurred. The instructions, when executed by a processor, are configured such that the message provided from the primary application to the mobile communication device is provided via a subscriber identity module toolkit framework. The instructions, when executed by a processor, further cause the processor to receive a call control event. The instructions, when executed by a processor, further cause the processor to receive a mobile originates short message service control event.

Various aspects of the invention may provide one or more of the following capabilities. More than one application included on a subscriber identity module (SIM) can be triggered by, and respond to control events issued by a mobile device. Multiple applications can be notified when a user of a mobile communication device has dialed a phone number. Multiple applications can be notified of the number dialed by a user of the mobile communication device. Multiple applications can be notified when a user of a mobile communication device attempts to send an SMS message. Multiple applications can be notified of the number to which a user of the mobile communication device attempts to send an SMS message. Applications included on a SIM can obtain last number dialed information without subscribing to call control events or call control notification. Last number dialed information can be obtained via an elementary file on a SIM. Applications can obtain last MOSMS number file information without subscribing to MOSMS control events or MOSMS control notification. Last MOSMS number file information can be obtained via an elementary file on a SIM.

These and other capabilities of the invention, along with the invention itself, will be more fully understood after a review of the following figures, detailed description, and claims.

DETAILED DESCRIPTION

Embodiments of the invention provide techniques for sharing control events issued by a mobile communication device with multiple applications that operate on a processor (e.g., a subscriber identity module (SIM)). One technique includes a mobile communication device that includes a processor including one or more applications. The processor includes a communication control dispatcher application that registers with the mobile communication device using a subscription. Other applications executed on the processor register with the communication control dispatcher application. The communication control dispatcher application receives control events issued by the mobile communication device which are relayed to the applications registered with the communication control dispatcher application. If an application registered with the communication control dispatcher application indicates that the received control event does not satisfy a predetermined condition, the registered application notifies the communication control dispatcher application which then passes the control event to the next registered application for approval. In the event that a certain registered application determines that the control event satisfies a predetermined condition (e.g., a parental control test) the registered application that performs the test sends a response directly to the mobile communication device and further processing of the control event by the communication control dispatcher application is ceased. Other embodiments are within the scope of the invention.

Figure 1:
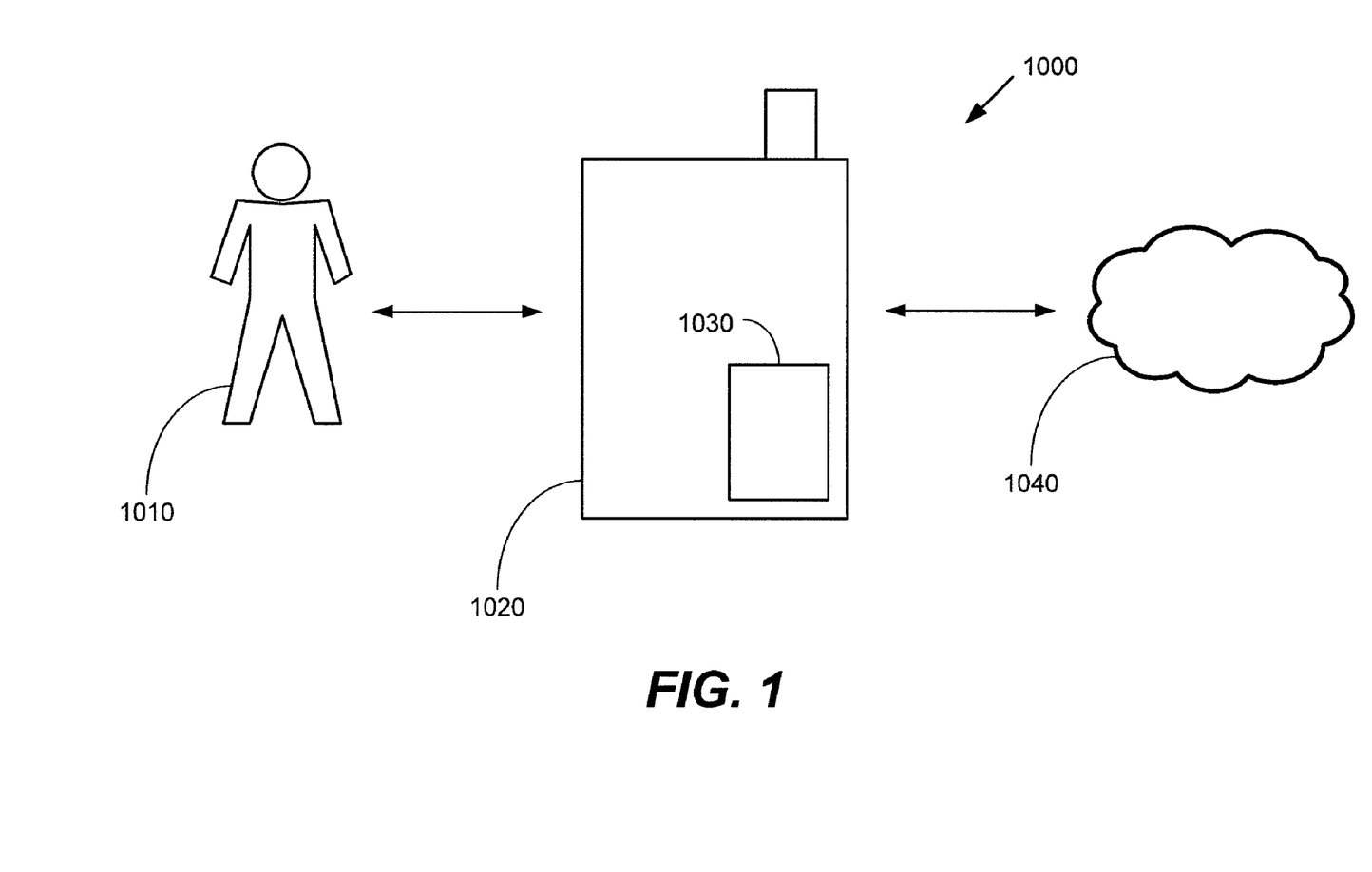
FIG. 1 is a schematic diagram of a communication system.

Referring to FIG. 1, a mobile communication control information management system 1000 includes a mobile device 1020, a SIM 1030, and a network 1040, which are configured to provide communication services to a subscriber 1010. The mobile device 1020 is, for example, a mobile communication device (e.g., a mobile phone, a Blackberry®, a personal digital assistant (PDA), etc.). The mobile device 1020 is configured to provide voice and/or data services between the mobile device 1020 and other communication devices via the network 1040. For example, using the mobile device 1020 the subscriber 1010 can make a phone call to another mobile device or a land line telephone. The mobile device 1020 includes the SIM 1030, which includes applications used by the mobile device 1020 (e.g., as described below). The SIM 1030 is preferably a (U)SIM although other SIMs can be used (e.g., UICC, RUIM, etc.). The mobile device 1020 is configured such that the subscriber 1010 can initiate a communication (e.g., a voice phone call, a short message service (SMS) message, e-mail, etc.) by inputting a phone number to which the communication is intended for. The mobile device 1020 is configured to transmit the information input by the subscriber 1010 to the network 1040 via the SIM 1030. Depending on the applications stored on the SIM 1030, the SIM 1030 can indicate to the mobile device 1020 whether it is ok to proceed with the communication event (e.g., whether it is ok to set-up a call). The network 1040 is configured to transmit a signal to the intended recipient indicating that the subscriber 1010 wishes to initiate a communication event.

Figure 2:
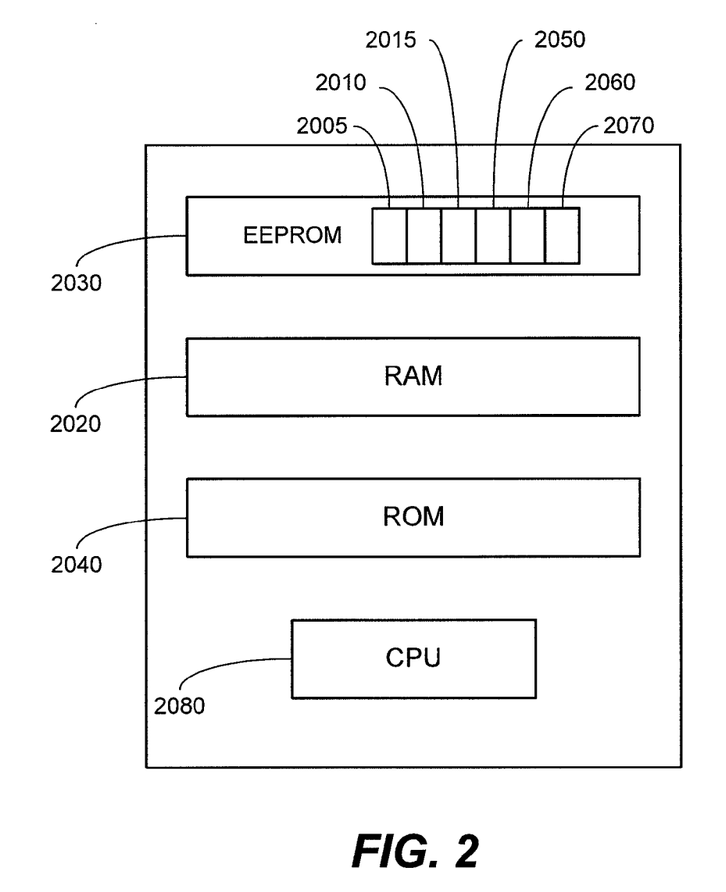
FIG. 2 is a schematic diagram of a SIM.

Referring to FIG. 2, the SIM 1030 includes a last number dialed file 2005, a communication control dispatcher (CCD) application 2010, a last MOSMS number file 2015, random access memory (RAM) 2020, Electrically Erasable Programmable Read-Only Memory (EEPROM) 2030, read only memory (ROM) 2040, applications 2050, 2060, 2070, and a processor 2080. While the CCD application 2010 is shown as part of the EEPROM 2030, the CCD application 2010 can reside elsewhere, e.g., in the ROM 2040. The CCD application 2010 is configured to register with the mobile device 1020 in order to indicate which communication events the CCD application 2010 wishes to receive. The CCD application 2010 preferably interfaces with a SIM Toolkit (STK) framework, which communicates with the mobile device 1020. The CCD application 2010 is further configured to dispatch call control events (or other restricted events) received from the mobile device 1020 to the applications 2050, 2060, 2070 (e.g., see FIG. 4A-4C and corresponding description).

Figure 3:
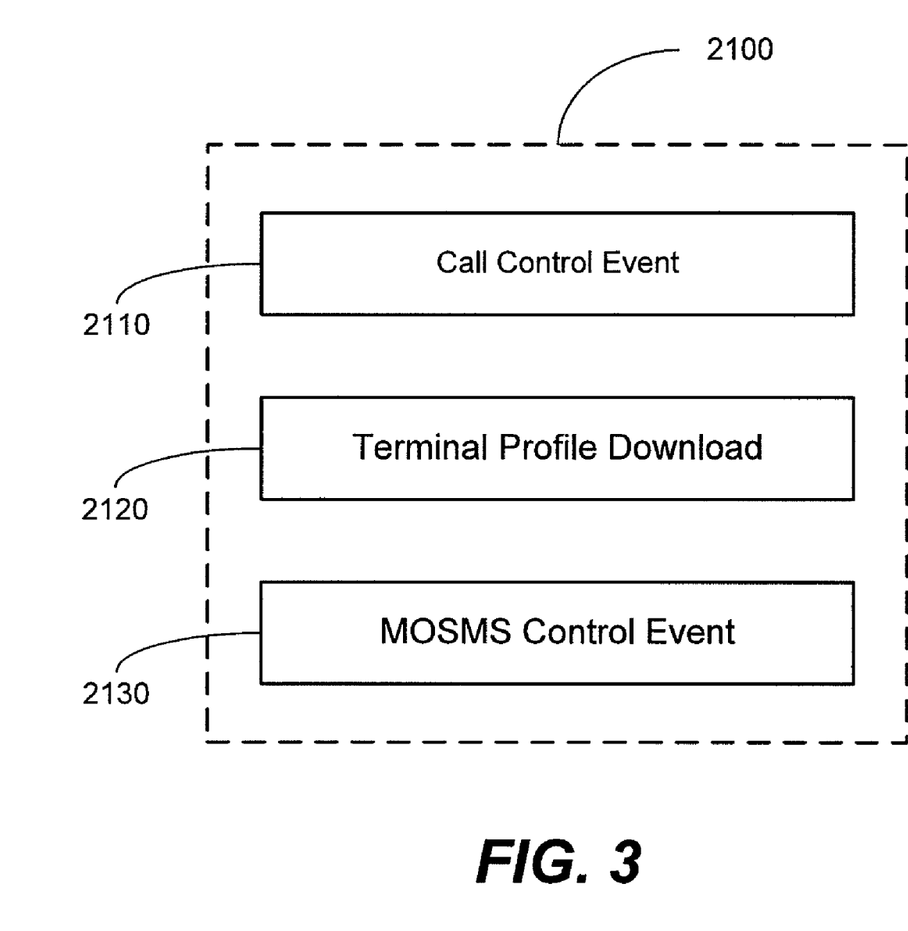
FIG. 3 is a diagram of events provided by the communication system shown in FIG. 1.

The CCD application 2010 is configured to manage call control information. For example, the CCD application 2010 can be considered an extension of the SIM Toolkit (STK) framework that can provide the ability for applications contained on the SIM 1030 to i) check if call control events are available, ii) subscribe to call control notification, iii) send call control responses to the mobile device, iv) unsubscribe from call control notifications, and v) get last number dialed information via an elementary file on the SIM 1030 without a subscribing to a call control event or a call control notification. The CCD application 2010 is configured to register with the mobile device 1020 thereby indicating which events the CCD application 2010 wishes to be informed of. For example, referring to FIG. 3, the CCD application 2010 can be configured to register with a call control event 2110 and a MOSMS control event 2130 of the mobile device 1020, such that the CCD application 2010 receives notice of the respective events.

Applications included in the SIM 1030 (e.g., applications 2010, 2050, 2060, 2070) can subscribe to call control events provided by the mobile device 1020 using what can effectively be defined as either an active or passive subscription. When an application subscribes to a call control event using an active subscription, the application is preferably permitted to send a call control response to the mobile device 1020. When an application subscribes to a call control event using a passive subscription, the application preferably cannot send a call control response to the mobile device 1020. The mobile device 1020 and the SIM 1030 are preferably configured such that only a single application can subscribe to a call control notification using an active subscription, while the remaining applications typically register using passive subscriptions. For example, if the CCD application 2010 registers with the mobile device 1020 using an active subscription, the applications 2050, 2060, 2070 would not be able to register as active applications with the mobile device 1020. The subscription type used by individual applications can be controlled using a high application priority during installation of the application and/or an elementary file on the SIM 1030. The priority of a specific application, however, can be adjusted at other times, e.g., remotely after deployment via a network update. An example of an application typically using an active subscription (e.g., in the absence of the CCD application 2010) would be a parental control application used to determine whether or not the caller has parental consent to call a number dialed by the user.

One or more of the applications 2050, 2060, 2070 are configured to register with the CCD application 2010 in order to indicate that the respective applications want to be notified of call events. The CCD application 2010 is configured such that when the mobile device 1020 sends a call control event to the SIM 1030, the CCD application 2010 fetches it and sends notification about the received call control event to at least one of the registered applications. Preferably, the CCD application 2010 relays the call control event starting with the registered application which registered first and ending with the registered application that registered last, although other priorities are possible. The CCD application 2010 can use, for example, an API-based method (e.g., communication control dispatcher library is publicized) and/or a sharable interface-based method (e.g., communication control dispatcher's binary and export files are publicized).

Figure 4A:
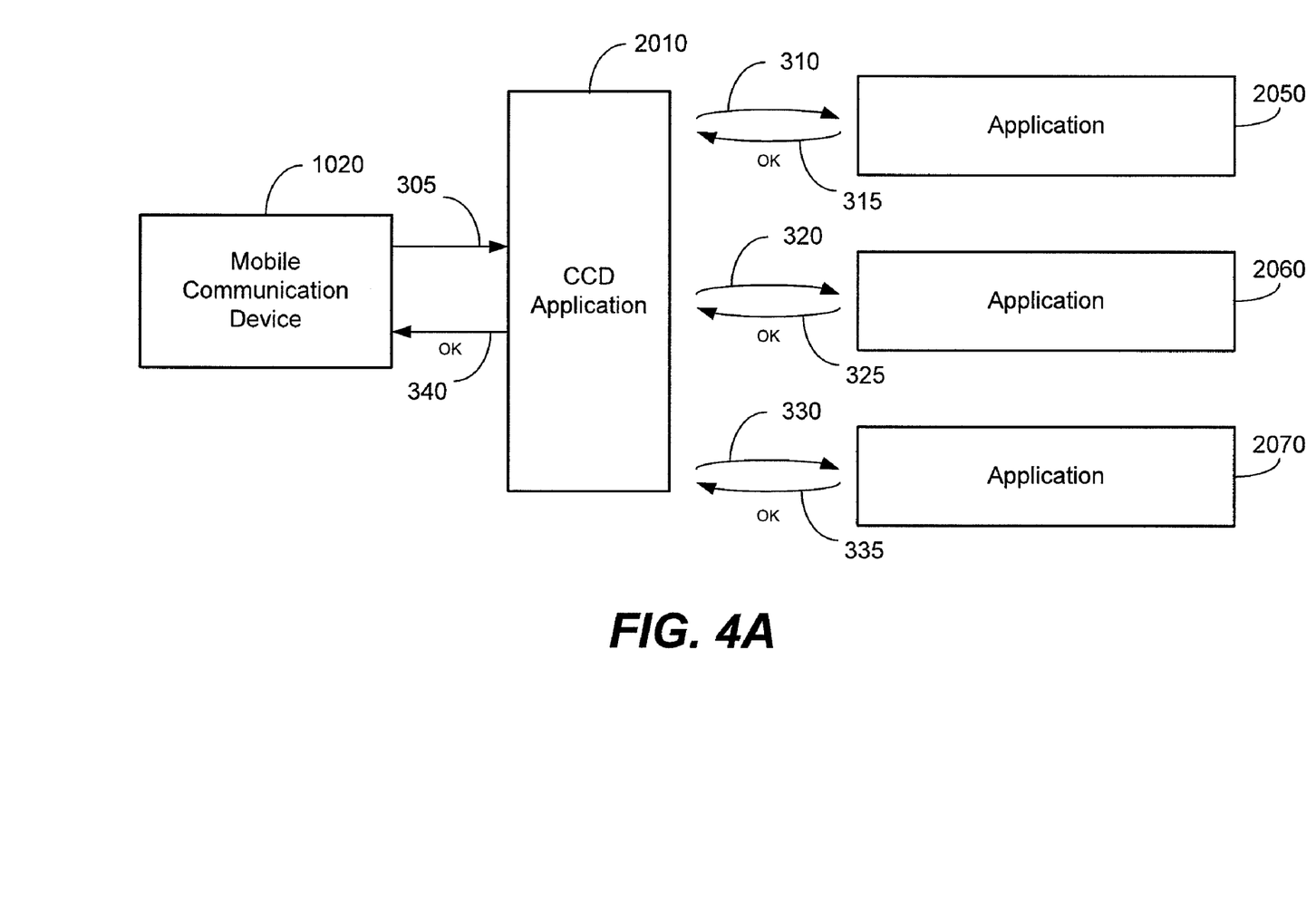
FIG. 4A is a diagram showing messages exchanged between portions of the communication system shown in FIG. 1.

Referring to FIG. 4A, the CCD application 2010 receives a call control event 305 from the mobile device 1020. The CCD application 2010 is configured to relay the call control event 305 to the registered application (e.g., the applications 2050, 2060, 2070) having the highest priority (in FIG. 4A, application 2050) using a message 310. The application 2050 is configured to process the control event to determine if the control event passes a predetermined test (e.g., an approved dialed number in the case of a parental control application). If the control event is approved, the application 2050 is configured to indicate to the CCD application 2010 that the call control event is approved using a message 315 (e.g., an OK response). If the control event is not approved, the application is configured to send a response directly to the mobile communication device 1020 (e.g., see FIG. 4B and corresponding description)(e.g., a not-OK response). In the event that the CCD application 2010 receives an approval message from an application, the CCD application 2010 is configured sequentially pass the call control event to the application with the next highest priority (e.g., in FIG. 4A, application 2060). Once all of the registered applications approve the call control event, the CCD application 2010 is configured to provide a response 340 to the mobile communication device 1020 (e.g., via the STK framework) indicating that the call control event is approved. Preferably, the "active" and "passive" designations do not apply to the relationships between the CCD application 2010 and the applications registered with it. However, if each of the applications 2050, 2060, 2070 registers with the CCD application 2010 in a passive mode, the CCD application 2010 effectively temporarily changes the registration type of an application to active whenever the CCD application 2010 relays a control event to the application registered with it (e.g., thereby allowing the registered application to send a response to the CCD application 2010).

Figure 4B:
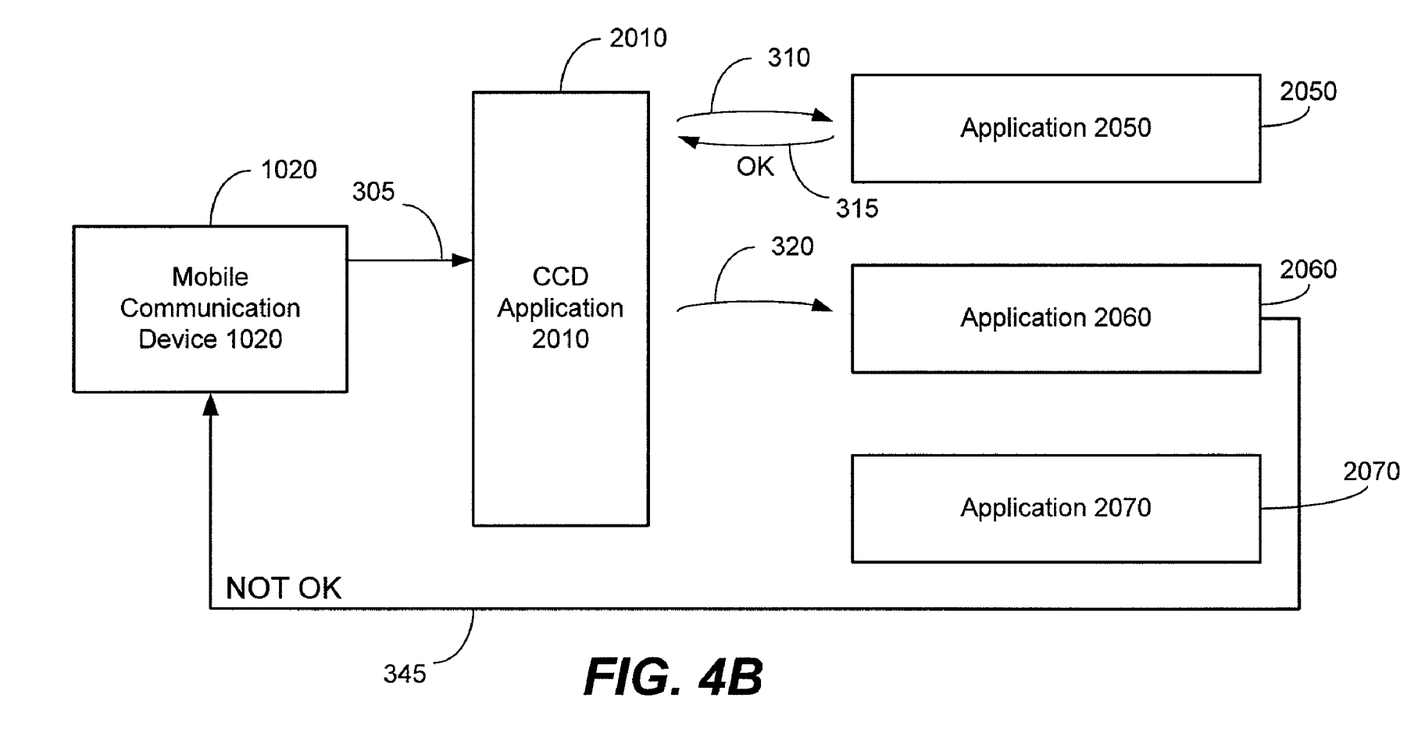
FIG. 4B is a diagram showing messages exchanged between portions of the communication system shown in FIG. 1.

Referring to FIG. 4B, if one of the registered applications does not approve the call control event 305 (in FIG. 4B, application 2060) the application is configured to send a message 345 to the mobile device 1020 indicating a rejection of the call control event 305 (e.g., which can cause the mobile device 1020 to abort a communication event). Preferably, the non-approving application sends the message 345 to the mobile device 1020 without using the CCD application 2010, although other configurations are possible. The non-approving application can be configured to include other information in the call control event 345 as well such as an updated telephone number. If one of the registered applications does not approve the call control event 305, the CCD application 2010 preferably does not pass the call control event to any further registered applications.

Figure 4C:
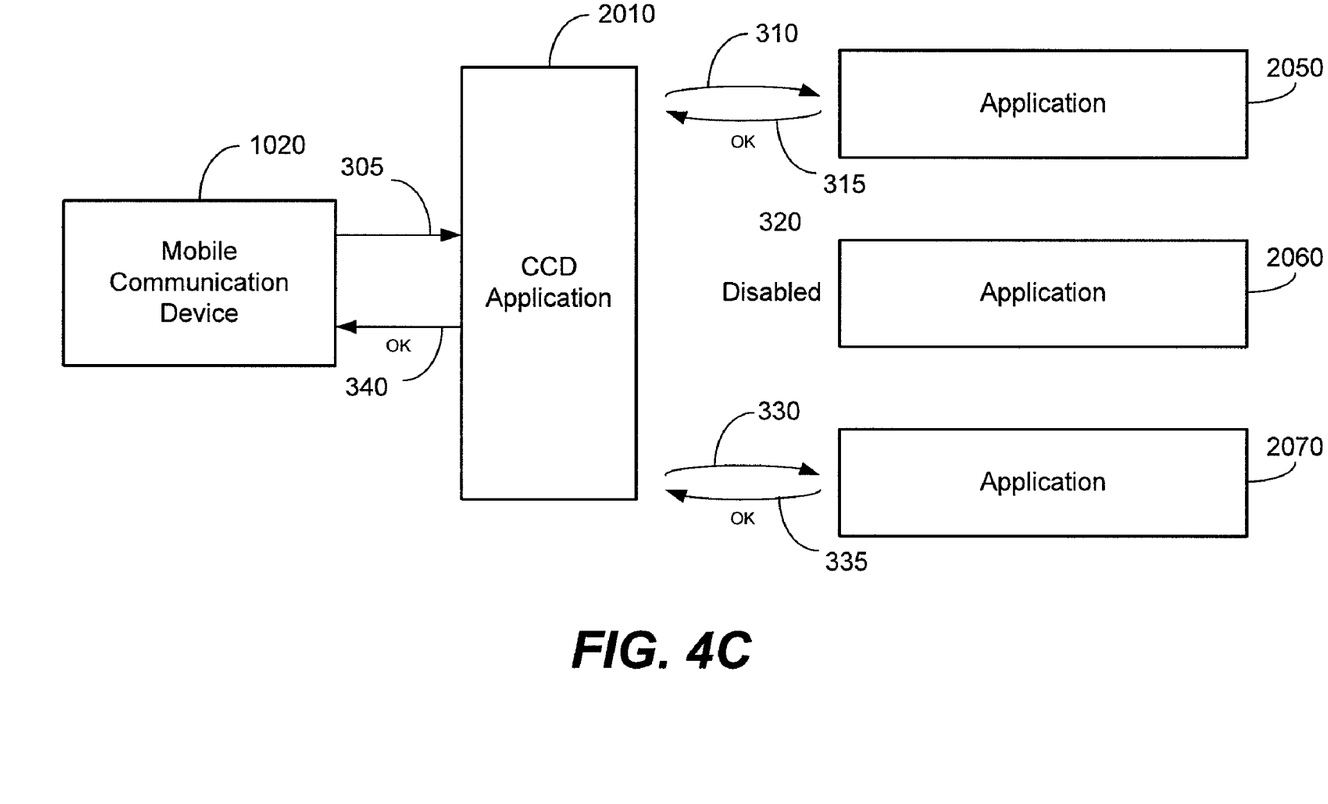
FIG. 4C is a diagram showing messages exchanged between portions of the communication system shown in FIG. 1.

Referring to FIG. 4C, the CCD application 2010 can be configured to bypass certain of the registered applications (in FIG. 4C, the application 2060). In the event that a certain registered application is bypassed, the CCD application 2010 can be configured to forward call control events as described with respect to FIGS. 4A-4B to all other enabled registered applications. Other configurations than those shown in FIGS. 4A-4C are possible.

Figure 5:
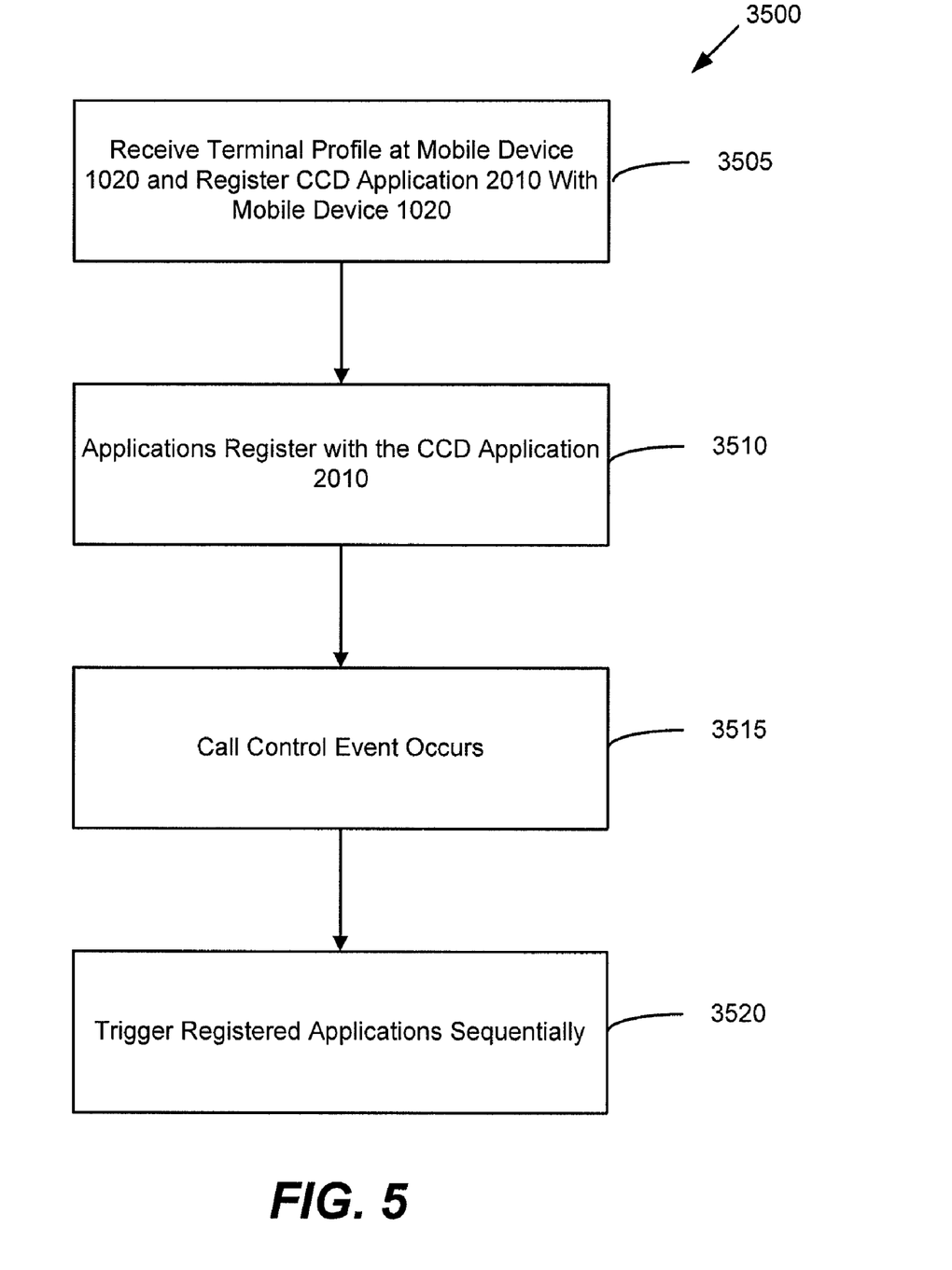
FIG. 5 is a diagram of a process for processing call control events.

In operation, referring to FIG. 5, with further reference to FIGS. 1-4C, a process 3500 for processing call control events using the system 1000 includes the stages shown. The process 3500, however, is exemplary only and not limiting. The process 3500 may be altered, e.g., by having stages added, altered, removed, or rearranged.

At stage 3505, the CCD application 2010 receives a terminal profile from the mobile device 1020 via the STK framework. The terminal profile is preferably provided to the CCD application 2010 each time the mobile device 1020 is powered up. The CCD application 2010 registers with the mobile device (e.g., through the STK framework) to receive call control events and/or MOSMS control events, although the CCD application 2010 can also register to receive other events. The CCD application 2010 subscribes to each event it desires.

At stage 3510, one or more of the applications 2050, 2060, 2070 register with the CCD application 2010. The applications 2050, 2060, 2070 indicate which control events should be forwarded to the respective applications. The CCD application 2010 determines a priority level for each of applications registered with it.

At stage 3515, the subscriber 1010 attempts to initiate a communication between the mobile device 1020 and another communication device causing a control event to be issued by the mobile device 1020. The control event can be, for example, a call control event and/or an MOSMS control event. The mobile device 1020 is configured to provide the control event to the CCD application 2010. Preferably the control event is provided via the STK framework, although the communication event can be provided directly to the CCD application 2010.

At stage 3520, the CCD application 2010 is configured to relay the control event to one or more of the registered applications (e.g., applications 2050, 2060, 2070). The CCD application 2010 relays the control event to the registered application having the highest priority. For purposes of this discussion it will be assumed that the application 2050 has the highest priority, the application 2060 has the second highest priority, and the application 2070 has the third highest priority. The application 2050 examines the control event to determine if it satisfies a predetermined event (e.g., determining whether the called number can be dialed under a parental control scheme). If the application 2050 determines that the control event satisfies the predetermined condition, the application 2050 sends an OK response to the CCD application 2010, otherwise the application 2050 sends a not-OK response to the mobile device 1020 (e.g., via the STK framework). Once the CCD application 2010 receives an OK response from the application 2050, the CCD application 2010 relays the control event to the registered application having the next highest priority (e.g., application 2060). Each time the CCD application 2010 receives an OK response from a registered application, the CCD application 2010 relays the control event to the application having the next highest priority. Once all registered applications have provided an OK response to the CCD application 2010, the CCD application 2010 sends an OK response to the mobile device 1020 (e.g., via the STK framework). In the event that the CCD application 2010 does not receive an OK response from a registered application to which it relayed the control event to (e.g., if the application provided a not-OK response directly to the mobile device 1020), the CCD application 2010 preferably does not relay the control event to any further registered applications.

Figure 6:
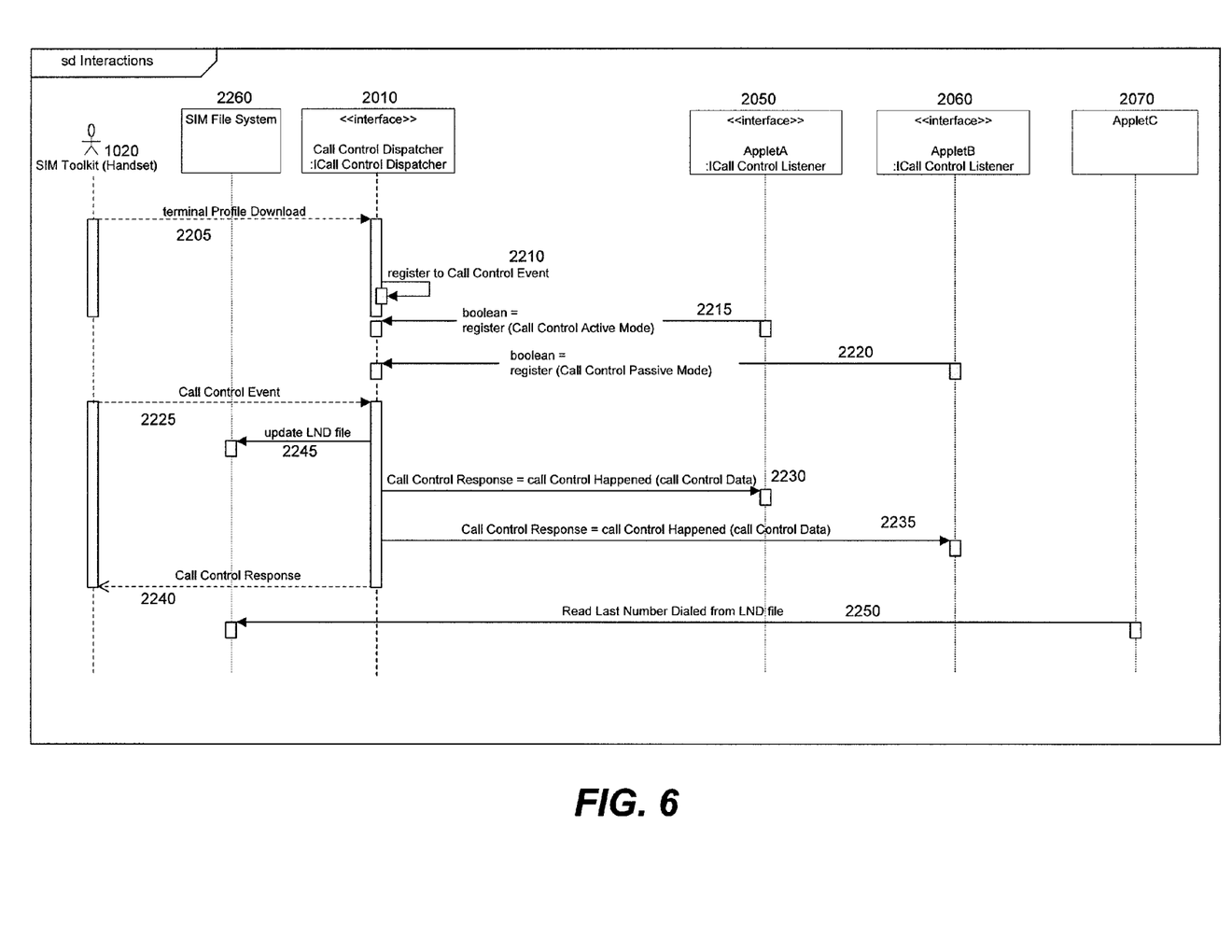
FIG. 6 is a diagram showing messages exchanged between portions of the communication system shown in FIG. 1.

Referring to FIG. 6, an exemplary operation of the CCD application 2010 is described through and interaction with the mobile device 1020 and the applications 2050, 2060, 2070. At stage 2205, the mobile device 1020 transfers the terminal profile of the mobile device 1020 through the terminal profile download event 2120. The mobile device preferably transfers the terminal profile each time the mobile device 1020 is powered up, although the terminal profile can be sent at other times as well. The CCD application 2010 subscribes to the call control event 2110 at stage 2210, at which time the CCD application 2010 can receive call control events and dispatch commands to other applications on the SIM 1030. At stage 2215, the application 2050 registers with the CCD application 2010. At stage 2220, application 2060 registers with the CCD application 2010. Preferably, when the applications 2050 and 2060 register with the CCD application 2010, active and/or passive designations are not made, although other configurations are possible. Furthermore, while not shown in FIG. 6, the application 2070 can also register with the CCD application 2010.

At stage 2225 call control event 2110 occurs. At stage 2230, the CCD application 2010 notifies the application 2050 that call control event 2110 has occurred. At stage 2235, (assuming the application 2050 provided a suitable response) the CCD application 2010 notifies application 2060 that call control event 2110 has occurred. At stage 2245, the last number dialed file 2005 on the SIM 1030 is preferably updated with the last number dialed by the subscriber 1010 (or another location as directed by the applications). Once the call control event 2110 occurs, the CCD application 2010 is configured to determine which registered application has the highest priority, at stage 2215, and to notify that application first (in this example, the application 2050). At stage 2220, preferably after receiving a suitable response from the application 2050, the CCD application 2010 can determine whether or not it can make a dispatch to the applications having a lower priority (e.g., if the response received from the application 2050 was an OK response). The CCD application 2010 can be configured to have intelligence to manage the priority of the applications registered with it and to mange the order that the registered applications should be notified. At stage 2240, after receiving an OK response from each of the registered applications, the CCD application 2010 sends to the mobile device 1020 a message indicating that the control event is approved (e.g., that the mobile device 1020 can complete a call attempted by the subscriber 1010).

Figure 7:
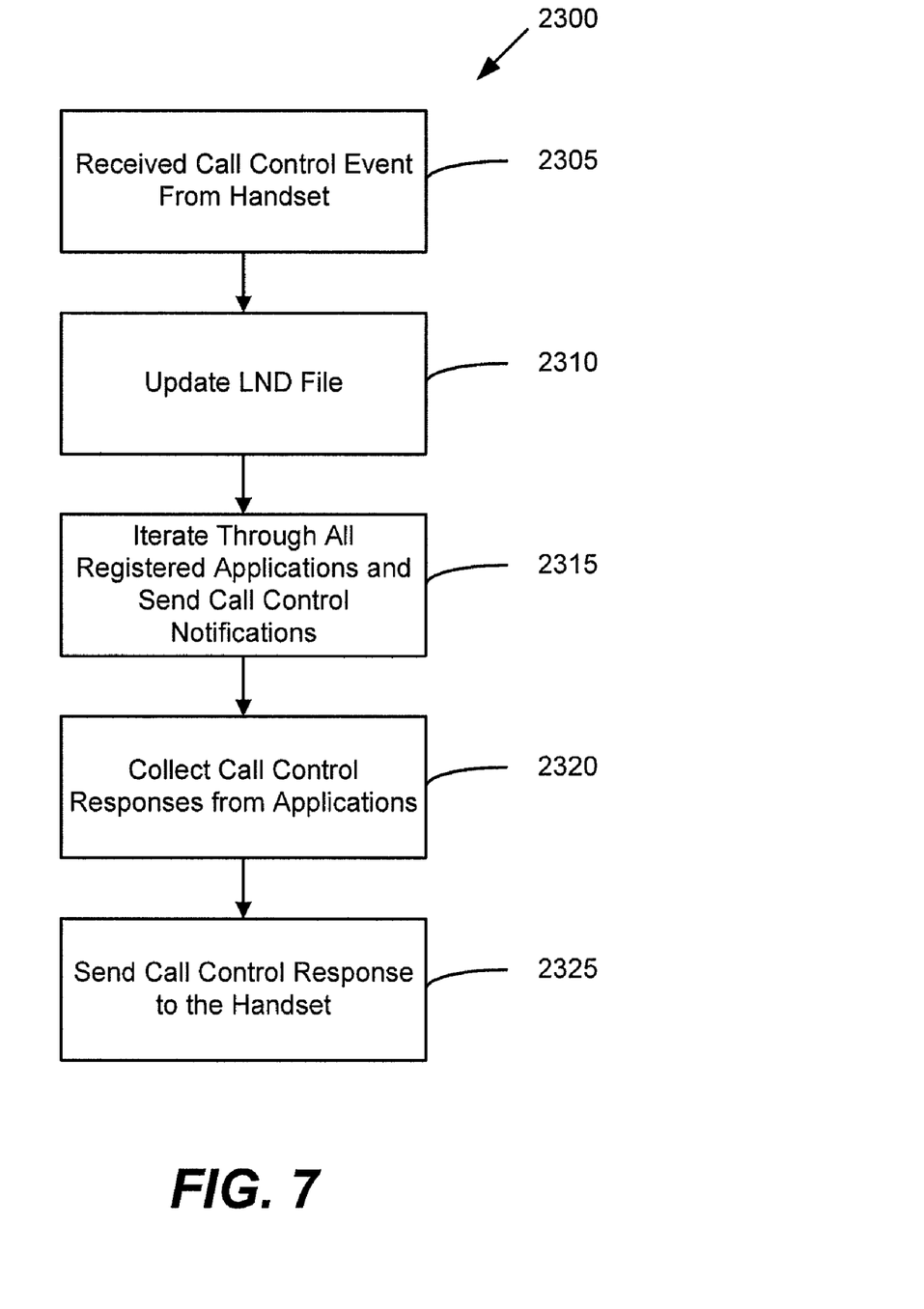
FIG. 7 is a diagram of a process carried out by the communication system shown in FIG. 1 if a user attempts to initiate a voice communication.

FIG. 7 explains an exemplary process 2300 that can occur once an attempt to dial a number is made (e.g., when the subscriber 1010 attempts to make an outgoing phone call). At stage 2305, the CCD application 2010 receives a call control event from the mobile device 1020 indicating that a communication is being attempted. At stage 2310, the last number dialed file 2005 (or other storage file as directed by the applications) is preferably updated on the SIM 1030. At stage 2315, the CCD application 2010 is configured to relay each registered application the call control event 2110 (e.g., in sequence as described above). At stage 2320, the CCD application 2010 collects call control event responses from the applications that approve the call control event (non-approvals are preferably sent directly to the mobile device 1020 via the STK framework). The role of the CCD application 2010 is preferably completed at stage 2325 when it relays an approval message to the mobile device 1020, although other configurations are possible.

Figure 8:
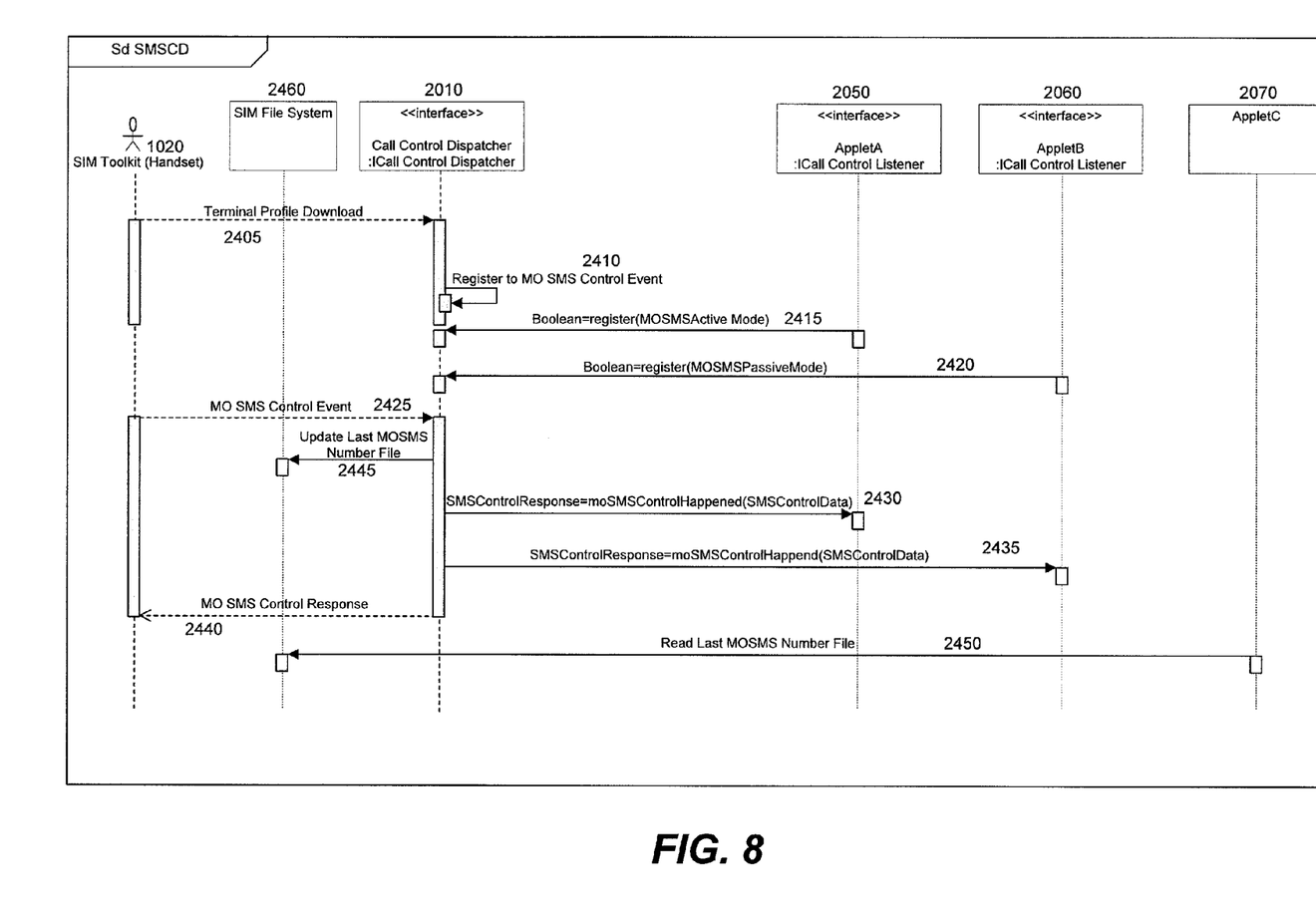
FIG. 8 is a diagram showing messages exchanged between portions of the communication system shown in FIG. 1.

Referring to FIG. 8, an exemplary operation of the CCD application 2010 is described through an interaction with the mobile device 1020 and the applications 2050, 2060, 2070. At stage 2405, the mobile device 1020 transfers the terminal profile of the mobile device 1020 through the terminal profile download event 2120. The mobile device 1020 preferably transfers the terminal profile each time the mobile device 1020 is powered-up, although the terminal profile can be sent at other times as well. The CCD application 2010 is configured to subscribe to the MOSMS control event 2130 at stage 2410, at which time the CCD application 2010 can receive MOSMS control events and dispatch commands to the registered applications on the SIM 1030. At stage 2415, the application 2050 is configured to register with the CCD application 2010. At stage 2420, the application 2060 is configured to register with the CCD application 2010. Preferably, when the applications 2050 and 2060 register with the CCD application 2010 active and/or passive designations are not made, although other configurations are possible. Furthermore, while not shown in FIG. 7, the application 2070 can also register with the CCD application 2010.

At stage 2425, the MOSMS control event occurs. At stage 2430, the CCD application 2010 notifies application 2050 that MOSMS control event 2130 has occurred. At stage 2435, (assuming the application 2050 gave a suitable response) the CCD application 2010 notifies application 2060 that MOSMS control event 2130 has occurred. At stage 2445, the last MOSMS number file 2015 (or other file as directed by the applications) on the SIM 1030 is updated with the last MOSMS number sent to the last number file 2015 by the subscriber 1010. Once the MOSMS control event occurs, the CCD application 2010 is configured to determine which registered application has the highest priority at stage 2415, and to notify that application first (in this example, the application 2050). At stage 2420, preferably after receiving a suitable response from the application 2050 the CCD application 2010 can determine whether or nit it can make a dispatch to the applications having a lower priority (if the response received from the application 2050 was an OK response). The CCD application 2010 can be configured to have intelligence to manage the priority of the applications registered with it and to manage the order that the registered applications should be notified. At stage 2440, after receiving a satisfactory response from each of the registered applications, the CCD application 2010 sends to the mobile device 1020 a message indicating that the control event is approved (e.g., that the mobile device 1020 can send a message attempted by the subscriber 1010).

Figure 9:
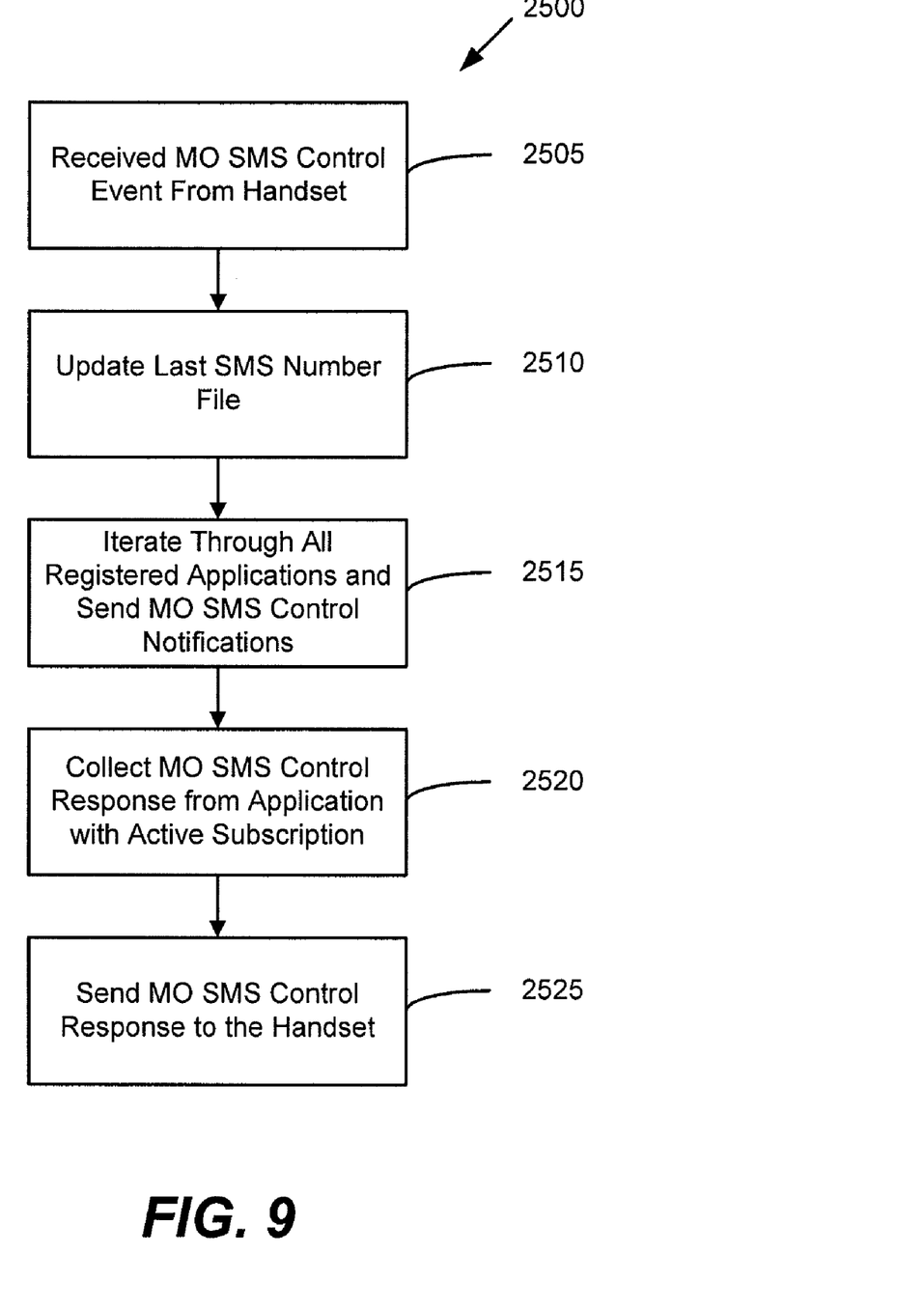
FIG. 9 is a diagram of a process carried out by the communication system shown in FIG. 1 if a user attempts to initiate an SMS communication.

FIG. 9 explains an exemplary process 2500 that occurs once an attempt to send an SMS is made (e.g., when the subscriber 1010 attempts to send an outgoing SMS message). At stage 2505, the CCD application 2010 receives an MOSMS control event 2130 from the mobile device 1020 indicating that a communication is being attempted. At stage 2510, the last SMS number file 2015 (or other storage file as directed by the applications) is preferably updated on the SIM 1030. At stage 2515, the CCD application 2010 is configured to relay each registered application the MOSMS control event 2130 (e.g., in sequence as described above). At stage 2520, the CCD application 2010 collects the MOSMS control event 2130 responses from the application that approve the control event (non-approvals are preferably sent directly to the mobile device via the STK framework). The role of the CCD application 2010 is preferably completed at stage 2525 when it relays an approval message to the mobile device 1020, although other configurations are possible.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations. Embodiments of the present invention can be used for devices other than mobile phones and over networks other than mobile networks.

While the primary application has been described as "dispatching" or "relaying" a received control event to a secondary application, the primary application can be configured to send a the control event (or a copy of the control event) received from the mobile device 1020 and/or can be configured to send information indicative of the received control event (e.g., a packet containing information that will allow the secondary application to identify the content of the received control event). Other configurations are possible.

While the present application describes registering for and sharing "control events," other types of events can be shared. For example all types of restricted events (e.g., an STK event that can only be used by a single application) can be shared Further, while the description above refers to the invention, the description may include more than one invention.

What is claimed is:

1. An apparatus for use with a mobile communication device, the mobile communication device being configured to provide events, the apparatus comprising:
   a memory including computer readable instructions; and
   a processor coupled to the memory and configured to execute, using the computer readable instructions stored in the memory, a primary application and a plurality of secondary applications;
   wherein the primary application is configured to register with the mobile communication device such that the primary application is configured to automatically receive an event from the mobile communication device;
   wherein the secondary applications are configured to register with the primary application;
   wherein the primary application is configured to relay a first message including information indicative of the received event to a first one of the registered secondary applications, and to receive a response to the first message from the first one of the secondary applications;
   wherein the primary application is configured to provide a message to the mobile communication device, in response to the received event, as a function of the response received from the first one of the plurality of secondary applications; and
   wherein the primary application is configured to prioritize the secondary applications such that information indicative of the received event is provided to each of the secondary applications in sequence according to a priority assigned to each respective secondary application.

2. The apparatus of claim 1 wherein the primary application provides a second message including information indicative of the received event to a second one of the secondary applications if the response is received from the first one of the secondary applications in response to the first message.

3. The apparatus of claim 1 wherein the secondary applications are further configured to analyze messages from the primary application to determine if a predetermined event has occurred.

4. The apparatus of claim 3 wherein the secondary applications are configured to provide the response to the primary application as a function of whether the predetermined event occurred.

5. The apparatus of claim 1 wherein the primary application is configured to communicate with the mobile communication device via a subscriber identity module toolkit framework.

6. The apparatus of claim 1 wherein the event is a call control event.

7. The apparatus of claim 1 wherein the event is a mobile originated short message service control event.

8. A method for use with a mobile communication device, the mobile communication device being configured to provide events, the method comprising:
 identifying events provided by the mobile communication device for a primary application to subscribe to;
 providing a message from the primary application to the mobile communication device including the identified events;
 receiving information, by the primary application, indicative of a plurality of secondary applications that desire notification of received events;
 dispatching a message including information indicative of received events to at least one of the plurality of secondary applications;
 determining whether a response was received from at least one of the secondary applications in response to the primary application dispatching the message; and
 prioritizing the secondary applications such that dispatched messages are provided to each of the secondary applications in sequence according to a priority assigned to each respective secondary application.

9. The method of claim 8 wherein dispatching the message includes dispatching a first message to a first one of the secondary applications, and a second message to a second one of the secondary applications if a response is received from the first one of the secondary applications in response to the first message.

10. The method of claim 8 further comprising analyzing, using a first one of the secondary applications, the dispatched message in order to determine if a predetermined event has occurred.

11. The method of claim 10 further comprising providing a response, using the first one of the secondary applications, to the primary application as a function of whether the predetermined event occurred.

12. The method of 8 wherein the message provided from the primary application to the mobile communication device is provided via a subscriber identity module toolkit framework.

13. The method of claim 8 further comprising receiving a call control event.

14. The method of claim 8 further comprising receiving a mobile originated short message service control event.

15. A non-transitory computer program product comprising instructions that, when executed by a processor, cause the processor to:
 identify events provided by the mobile communication device for a primary application to subscribe to;
 provide a message from the primary application to the mobile communication device including the identified events;
 receive information, by the primary application, indicative of a plurality of secondary applications that desire notification of received events;
 dispatching a message including information indicative of received events to at least one of the plurality of secondary applications;
 determine whether a response was received from at least one of the secondary applications in response to the primary application relaying a received event; and
 prioritize the secondary applications such that dispatched messages are provided to each of the secondary applications in sequence according to a priority assigned to each respective secondary application.

16. The non-transitory computer program product of claim 15 wherein the instructions, when executed by a processor, further cause the processor to dispatch a first message a first one of the secondary applications, and dispatch a second message to a second one of the secondary applications if a response is received from the first one of the secondary applications in response to the first message.

17. The non-transitory computer program product of claim 15 wherein the instructions, when executed by a processor, further cause the processor to analyze, using a first one of the secondary applications, the dispatched message in order to determine if a predetermined event has occurred.

18. The non-transitory computer program product of claim 17 wherein the instructions, when executed by a processor, further cause the processor to provide a response, using the first one of the secondary applications, to the primary application as a function of whether the predetermined event occurred.

19. The non-transitory computer program product of 15 wherein the instructions, when executed by a processor, are configured such that the message provided from the primary application to the mobile communication device is provided via a subscriber identity module toolkit framework.

20. The non-transitory computer program product of claim 15 wherein the instructions, when executed by a processor, further cause the processor to receive a call control event.

21. The non-transitory computer program product of claim 15 wherein the instructions, when executed by a processor, further cause the processor to receive a mobile originates short message service control event.

* * * * *